United States Patent [19]

DiSario

[11] Patent Number: 5,727,799
[45] Date of Patent: Mar. 17, 1998

[54] LADDER CADDY

[75] Inventor: Peter DiSario, East Moriches, N.Y.

[73] Assignee: Peter DiSario-RPM Painting, East Moriches, N.Y.

[21] Appl. No.: 542,816

[22] Filed: Oct. 13, 1995

[51] Int. Cl.[6] ........................................ B62B 1/20
[52] U.S. Cl. ................... 280/47.3; 182/20; 280/47.32; 280/78
[58] Field of Search ................ 182/20, 116; 280/30, 280/414.2, 47.3, 47.331, 78, 35, 47.32

[56]  References Cited

U.S. PATENT DOCUMENTS

| | | | |
|---|---|---|---|
| 1,139,494 | 5/1915 | Cropp | 280/30 X |
| 2,416,492 | 2/1947 | Neeley | 280/47.3 |
| 2,546,604 | 3/1951 | Lafky | 280/78 X |
| 2,624,588 | 1/1953 | Jones | 280/47.3 X |
| 4,428,456 | 1/1984 | Rohde | 182/20 |
| 4,544,172 | 10/1985 | Poulouin | 280/47.331 |
| 4,579,357 | 4/1986 | Webster | 280/47.331 |
| 4,822,065 | 4/1989 | Enders | 280/47.331 |
| 5,195,611 | 3/1993 | Untz | 182/116 X |
| 5,314,042 | 5/1994 | Adams | 182/20 |

*Primary Examiner*—Brian L. Johnson
*Assistant Examiner*—Michael Mar
*Attorney, Agent, or Firm*—John Q. McQuillan

[57]  ABSTRACT

A dolly for supporting a ladder during movement of the ladder to a work site. The dolly has a frame which is adapted to be attached by clips to the rungs of the ladder. The dolly has a single relatively large wheel in terms of the width of the ladder pivotally mounted on the frame for providing a rolling support for the ladder and to enable a single individual to move a long heavy ladder conveniently into position for use at a work site. The dolly is especially useful when moving a ladder, especially a heavy ladder such as an extension ladder, over sloping or rough ground to a work site.

6 Claims, 4 Drawing Sheets

LADDER CADDY

BACKGROUND OF THE INVENTION

1. Field of the Invention

This invention relates generally to a wheel device or caddy which supports a ladder and enables one individual to move the ladder, especially where the ladder is a heavy and long ladder such as an extension ladder.

2. Description of the Prior Art

U.S. Pat. No. 4,564,203, issued on Jan. 14, 1986, shows a single small wheel pivotally mounted on one end of a step ladder.

U.S. Pat. No. 4,049,283, issued on Sept. 20, 1977, (based upon U.S. Pat. No. 3,991,852, issued Nov. 16, 1976) shows a ladder caddy which has a support using one pair of upright legs and a pair of small wheels.

U.S. Pat. No. 3,596,922, issued on Aug. 3, 1971, shows a utility cart with a single small wheel.

U.S. Pat. Nos. 3,074,507, issued Jan. 22, 1963, 4,009,762, issued Mar. 1, 1977, and 5,086,872, issued Feb. 11, 1992, each show multiple small wheel devices for supporting ladders.

SUMMARY OF THE INVENTION

The present invention comprises a dolly for supporting a ladder during movement of the ladder to a work site. The dolly has a frame which is adapted to be attached by clips to the rungs of the ladder. The dolly has a single comparatively large wheel in terms of the width of a ladder to be mounted on the frame of the dolly for providing a rolling support to the ladder and to enable a single individual to move a long heavy ladder conveniently into position for use at a work site. The dolly is especially useful when moving a ladder, especially a heavy ladder, over sloping or rough ground.

Thus an object of the invention is to provide a single wheel dolly or a rolling support for a ladder to enable the ladder, especially a heavy ladder, to be moved conveniently from one location to another, such as to a work site.

It is another object of the invention to provide a single wheel dolly for rollingly supporting a ladder during movement thereof by one individual.

DETAILED DESCRIPTION OF THE PREFERRED EMBODIMENTS

Figure 1:
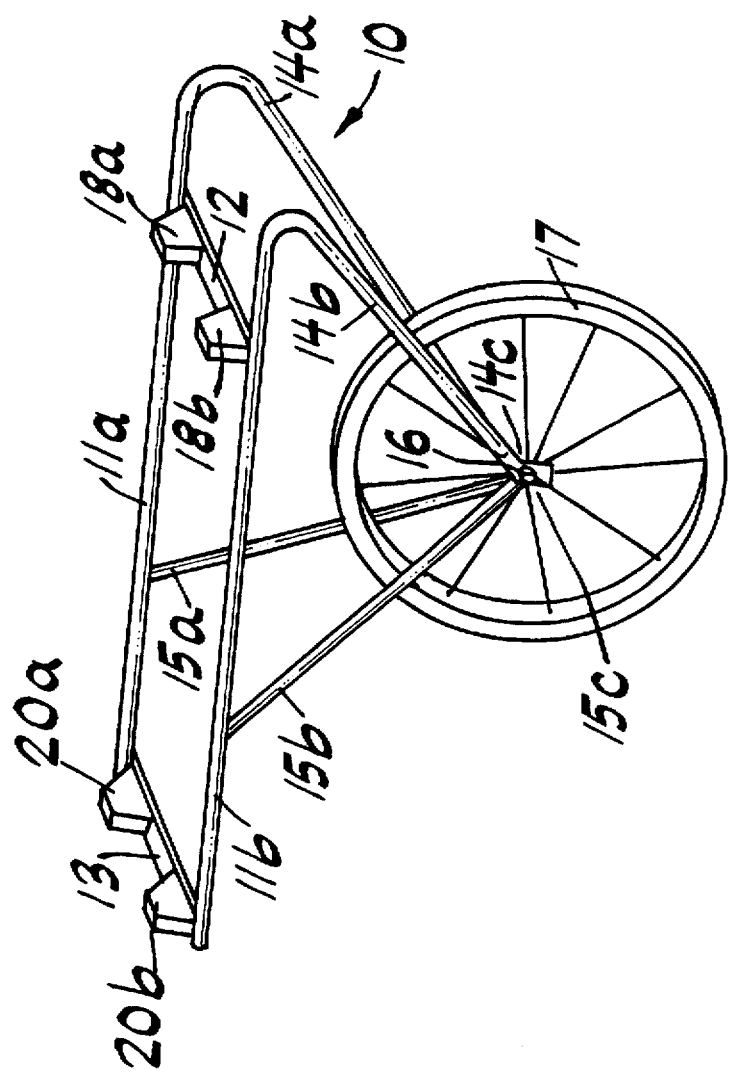
FIG. 1 is an isometric view of the caddy of the invention for transporting a ladder.

As shown in FIG. 1, caddy 10 of the invention comprises a frame 11 having a pair of longitudinal members 11a and 11b and a pair of transverse members 12 and 13, each connected at the opposite end portions thereof to the longitudinal members. Thus the two longitudinal members 11a and 11b and transverse members 12 and 13 form a rectangular shaped frame 11.

As shown in FIG. 1, the caddy 10 includes a longitudinal support members 14a and 14b which are V-shaped in form with the upper end portion of each of the support members 14a and 14b connected to the longitudinal members 11a and 11b. Support members 15a and 15b also in a V-shaped form have their upper end portions attached to the longitudinal support members 11a and 11b, respectively. The apex 14c of the V-shaped support members 14a and 14b is connected to apex 15c of support members 15a and 15b.

At the location of apices 14c and 15c which are joined together, there is pivotally mounted axle 16 of wheel 17. The diameter of wheel 17 is comparatively large is terms of a length of each of the transverse members 12 and 13. The upper portion of wheel 17 spaced apart from frame 11.

Figure 2:
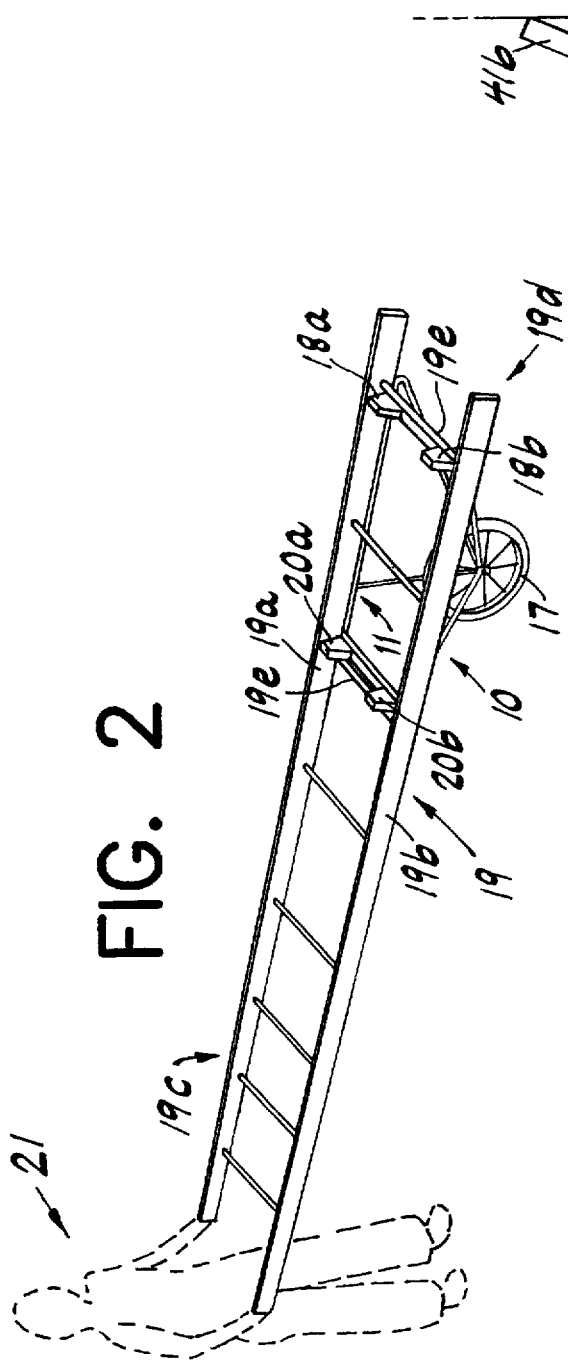
FIG. 2 is an isometric view showing a ladder supported by the caddy of the invention and being directed by an individual user.

On transverse member 12 there is mounted a pair of clips or lugs 18a and 18b spaced apart along the transverse member with the interval between the portions of the clips adjacent the longitudinal members 11a and 11b being less than the spacing between the side rails of ladder 19 shown in FIG. 2. Thus clips 18a and 18b as shown in FIG. 2 can extend between side rails 19a and 19b of ladder 19 when the ladder is placed upon frame 11 of the caddy 10.

As shown in FIG. 1 transverse member 13 is provided with a pair of clips or lugs 20a and 20b which are positioned on the transverse member in a manner similarly to that of clips 18a and 18b on transverse member 12. Accordingly as shown in FIG. 2, clips 20a and 20b can extend between the side rails 19a and 19b of ladder 19 when the ladder is placed upon caddy 10.

In FIG. 2 there is shown a human operator 21 who can support the base end portion 19c of the ladder 19 when the ladder is resting upon caddy 10 at the upper end or top end 19d of the ladder. The configuration shown in FIG. 2 of ladder 19 having its upper end portion 19d resting upon caddy 10 enables the operator 21 to manipulate and direct the ladder in the manner similar to an operator manipulating or directing a wheelbarrow. Thus the operator can grip the side rails 19a and 19b of the ladder 19 and advance the ladder resting upon the caddy in the manner of advancing a wheel barrow. Furthermore, the operator can by applying lateral force to side rails 19a and 19b to cause the path of travel of the caddy to change, again in the manner of turning a wheel barrow. Thus the provision of the single wheel 17 to caddy 10 and the comparatively large size of wheel 17 enable the operator to advance the ladder supported by the caddy over a rough surface or an inclined surface, that is the ground surface underlying the site to which the operator is to deliver the ladder.

It can be seen in FIG. 2 that the clips 18a and 18b and 20a and 20b are adapted to engage rungs 19e of the ladder 19 in order that the caddy is fixed with respect to a given location along the length of the side rails 19a and 19b of the ladder 19. If desired and in order to reduce the vertical load of the ladder to be supported by the operator, caddy 10 can be moved in a direction toward the center of ladder 19, thereby placing more weight of the ladder on the caddy.

Figure 3:
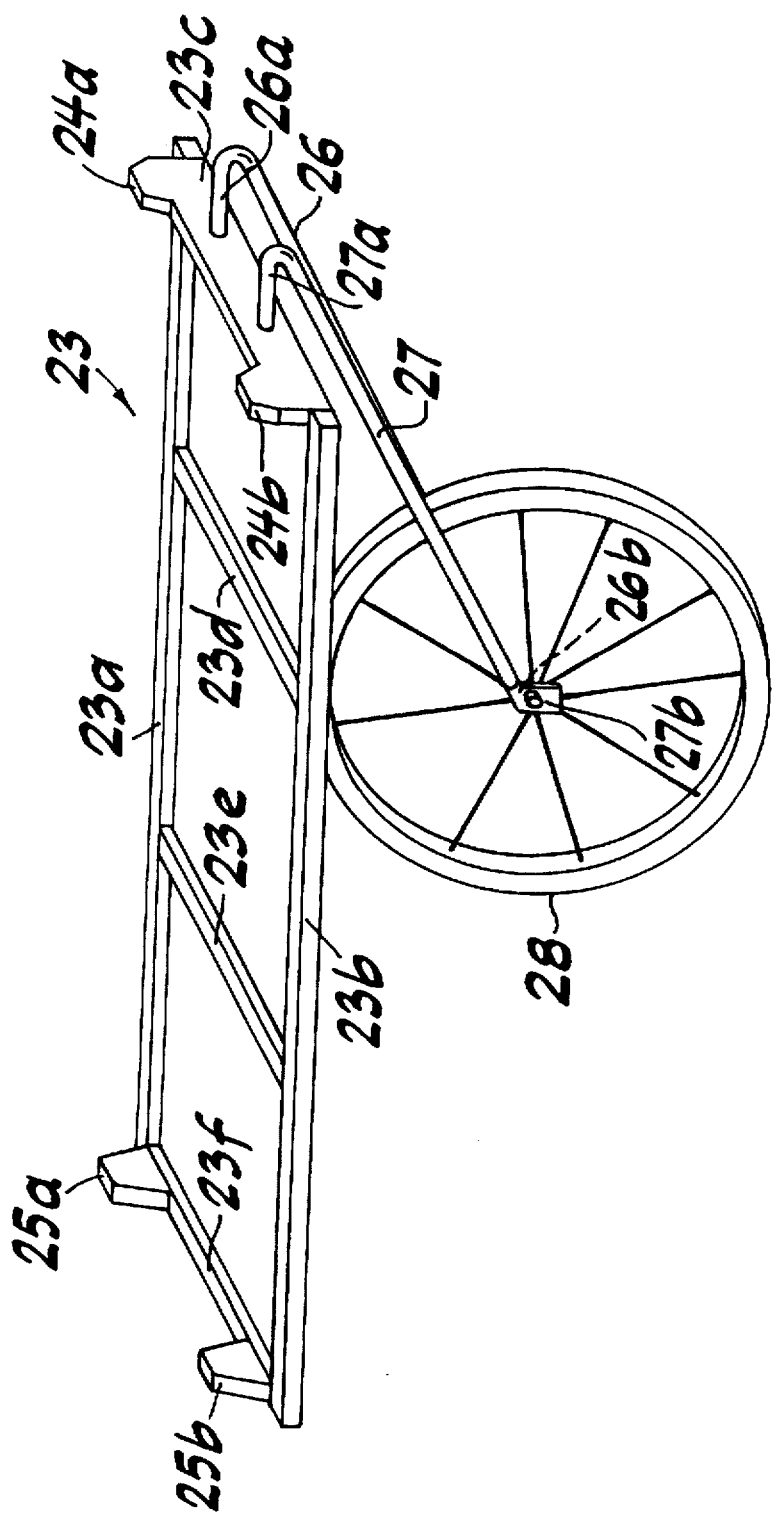
FIG. 3 is an isometric view of another embodiment of the caddy of the invention.

In FIG. 3 there is shown another embodiment of the caddy of the invention, caddy 22, having frame 23 which has longitudinal members 23a and 23b and transverse members 23c, 23d, 23e, and 23f. Clips or lugs 24a and 24b are disposed upon transverse member 23c and spaced apart to enable the clips to extend between side rails of a ladder when the ladder is placed upon caddy 22. Similarly clips or lugs 25a and 25b are disposed upon transverse member 23f and are spaced apart to extend between the side rails of a ladder. When a ladder is placed upon caddy 22, clips 24a and 24b and 25a and 25b are adapted to engage the rungs of the ladder.

As shown in FIG. 3 elongated support members 26 and 27 are in a V-shaped form with spaced end portion 26a and 27a attached to transverse member 23c. The lower end portions of the support members, portions 26b and 27b, are joined at the apex of the V-shaped support members. At the apex there is pivotally mounted wheel 28 which at its upper portion is adapted to clear frame 23.

Thus it can be seen in FIG. 3 that caddy 22 by simply employing one pair of support members 26 and 27 in V-shaped form is more compact than caddy 10 shown in FIG. 1 which employs two pairs of support members 14a, 14b and 15a and 15b. In addition the cantilever construction of support members 26 and 27, as shown in FIG. 3, introduces a resilient or spring-like property to caddy 23 which improves the handling of the caddy for supporting a ladder, especially when traversing a rough or irregular surface or ground.

Figure 4:
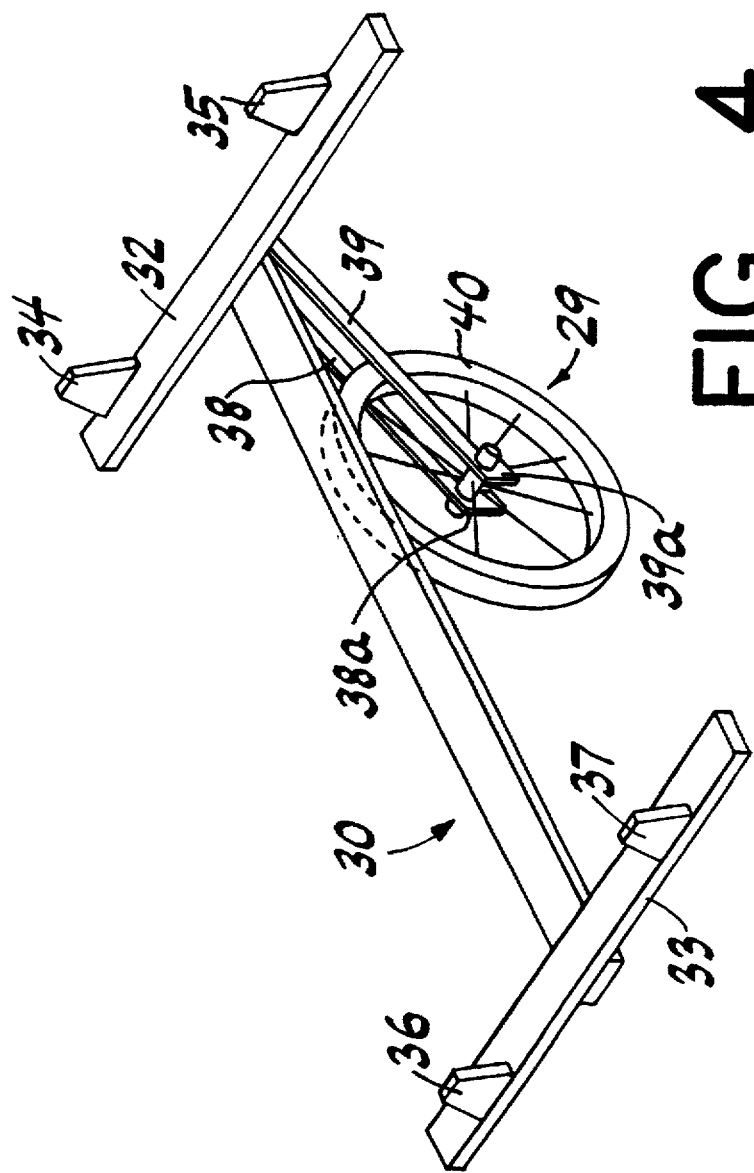
FIG. 4 is an isometric view of still another embodiment of the caddy of the invention.

In FIG. 4 there is shown still another embodiment of the caddy of the invention, caddy 29. Caddy 29 includes a frame 30 comprising a single longitudinal member 31 and a pair of transverse members 32 and 33. Spaced apart on transverse member 32 are clips 34 and 35 while on transverse member 33 there are disposed clips 36 and 37. The interval between the clips in the direction of the transverse member enables the clips to be disposed between the side rails of a ladder to be carried by caddy 29 with the clips engaging and securing the rungs of the ladder adjacent thereto.

Caddy 29 includes a pair of elongated support members 38 and 39 which are attached at the upper end thereof to transverse member 32. The lower portions of 38a and 39a of the elongated support members are joined together to provide a pivotally support for wheel 40. The construction of elongated support members 38 and 39 as result of being attached to transverse member 32 provides a resilience residence or flexibility to the support of wheel 40, thereby improving the handling of the caddy over a rough or irregular surface.

Figure 5:
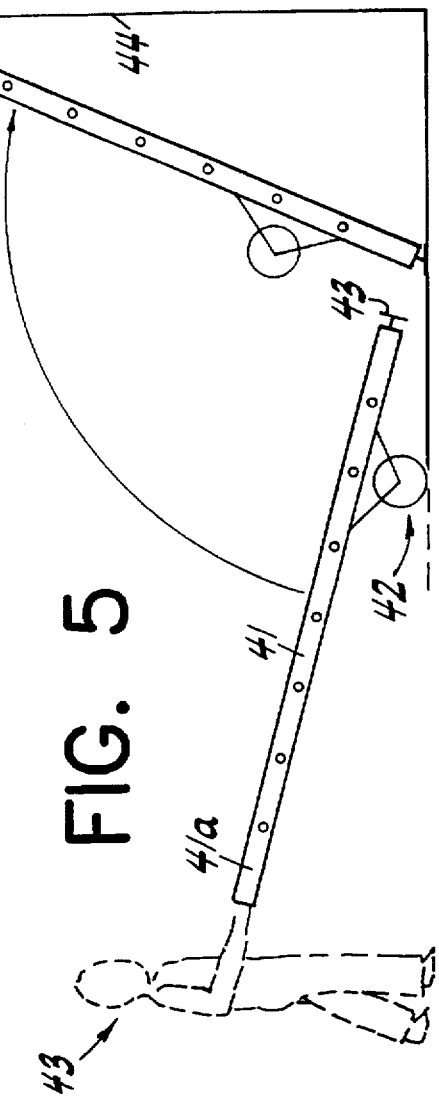
FIG. 5 is a composite view showing a ladder supported by the caddy of the invention being moved from a substantially horizontal position to a substantially vertical position against a wall.

In FIG. 5 there is shown ladder 41 supported by a caddy 42 which can be a caddy of any of the embodiments of the invention. As viewed in the left of FIG. 5, the operator 43 is preparing to elevate the end 41a of the ladder 41 with the footings 43 of the ladder in contact with a ground surface. Thereafter the operator can pivot ladder 41 with caddy 42 attached thereto until the upper end portion 41b is brought to a position against vertical wall 44.

It should be noted that the caddies 22 of FIG.3 and 29 of FIG. 4 can be positioned with respect to a ladder with the elongated support members either sloping toward or away from the center portion of a ladder to be supported thereon. When sloping away the center portion of a ladder, elongated support members 26 and 27 of caddy 22 and elongated support members 38 and 39 of caddy 29 enable the elongated support members to act as casters for the wheel of the caddy, thereby facilitating the steering of a ladder on the caddy by the operator.

What is claimed is:

1. A caddy for transporting a ladder having a plurality of rungs extending transversely between a pair of spaced apart, longitudinally extending side rails, the caddy comprising:

a frame including a pair of longitudinal members of a length at least equal to the longitudinal spacing between two adjacent rungs and a pair of transverse members mounted on the longitudinal members and longitudinally spaced apart from one another and extending transversely with respect thereto for a distance at least corresponding to the spacing between the side rails of the ladder, a pair of clips mounted on the upper surface of each transverse member, the clips in each pair being spaced apart at an interval less then the spacing between the side rails to enable each of the pairs of clips to be disposed therebetween when a ladder is placed on the frame, a single wheel having a diameter which is comparatively large in terms of the length of a transverse member, and a pair of elongated forward support members attached to the pair of longitudinal members, each forward support member extending downwardly and rearwardly from a forward end of each longitudinal member, the pair of forward support members extending inwardly in a V-shape to form an apex at their lower ends, and a pair of elongated rearward support members attached to the pair of longitudinal members, each rearward support member extending downwardly and forwardly from a rearward end portion of each longitudinal member, the pair of rearward support members extending inwardly in a V-shape to form an apex at their lower ends, the lower ends of the forward and rearward support members being interconnected to form a transverse axle support for rotatably supporting the single wheel, wherein the caddy is adapted to be releasably attached to the ladder by connecting the pairs of clips which are mounted on the pair of transverse members to two adjacent rungs on the ladder.

2. A caddy in accordance with claim 1 in which each of the clips are tapered with respect to the transverse member with the narrower portion of each tapered clip being opposite to the transverse member.

3. A caddy in accordance with claim 1 in which the wheel has a diameter substantially corresponding to the length of a transverse member.

4. In combination a ladder having a plurality of rungs extending transversely between a pair of spaced apart, longitudinally extending side rails and a caddy for transporting the ladder disposed upon the caddy comprising:

a frame including a pair of longitudinal member of a length at least equal to the longitudinal spacing between two adjacent rungs and a pair of transverse members mounted on the longitudinal members and longitudinally spaced apart from one another and extending transversely with respect thereto for a distance at least corresponding to the spacing between the side rails of the ladder, a pair of clips mounted on the upper surface of each transverse member, the clips in each pair being spaced apart at an interval less then the spacing between the side rails to enable each of the pairs of clips to be disposed between the side rails of the ladder placed on the frame of the caddy, a single wheel having a diameter which is comparatively large in terms of the length of a transverse member, and a pair of elongated forward support members attached to the pair of longitudinal members, each forward support member extending downwardly and rearwardly from a forward end of each longitudinal member, the pair of forward support members extending inwardly in a V-shape to form an apex at their lower ends, and a pair of elongated rearward support members attached to the pair of longitudinal members, each rearward support member extending downwardly and forwardly from a rearward end portion of each longitudinal member, the pair of rearward support members extending inwardly in a V-shape to form an apex at their lower ends, the lower ends of the forward and rearward support members being interconnected to form a transverse axle support for rotatably supporting the single wheel, wherein the caddy is adapted to be releasably attached to the ladder by connecting the pairs of clips which are mounted on the pair of transverse members to two adjacent rungs on the ladder.

5. The combination in accordance with claim 4 in which each of the clips are tapered with respect to the transverse member with the narrower portion of each tapered clip being opposite to the transverse member.

6. A caddy in accordance with claim 4 in which the wheel has a diameter substantially corresponding to the length of a transverse member.

* * * * *